(12) United States Patent
Cho

(10) Patent No.: US 10,206,090 B2
(45) Date of Patent: Feb. 12, 2019

(54) METHOD AND DEVICE FOR SEARCHING FOR AVAILABLE DEVICE IN M2M ENVIRONMENT

(71) Applicant: KT CORPORATION, Gyeonggi-do (KR)

(72) Inventor: Yong Lae Cho, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 41 days.

(21) Appl. No.: 15/100,266

(22) PCT Filed: Nov. 26, 2014

(86) PCT No.: PCT/KR2014/011412
§ 371 (c)(1),
(2) Date: May 27, 2016

(87) PCT Pub. No.: WO2015/080461
PCT Pub. Date: Jun. 4, 2015

(65) Prior Publication Data
US 2017/0006455 A1 Jan. 5, 2017

(30) Foreign Application Priority Data

Nov. 29, 2013 (KR) .......................... 10-2013-0147776
Dec. 11, 2013 (KR) .......................... 10-2013-0154181

(Continued)

(51) Int. Cl.
*H04W 8/00* (2009.01)
*G06F 17/30* (2006.01)
*H04W 4/70* (2018.01)

(52) U.S. Cl.
CPC ...... *H04W 8/005* (2013.01); *G06F 17/30867* (2013.01); *G06F 17/30991* (2013.01); *H04W 4/70* (2018.02)

(58) Field of Classification Search
CPC . H04W 8/005; H04W 4/005; G06F 17/30991; G06F 17/30867
See application file for complete search history.

(56) References Cited

U.S. PATENT DOCUMENTS

2003/0167329 A1  9/2003  Kurakake et al.
2007/0286136 A1* 12/2007  Rittle ................. H04W 8/005
                                                370/338
(Continued)

FOREIGN PATENT DOCUMENTS

| KR | 10-2011-0053175 A | 5/2011 |
| KR | 10-2012-0104341 A | 9/2012 |
| KR | 10-2013-0064217 A | 6/2013 |

*Primary Examiner* — Jackie Zuniga Abad
(74) *Attorney, Agent, or Firm* — IP Legal Services, LLC

(57) ABSTRACT

The present invention relates to a method and a device for searching for an available device in an M2M environment. According to an embodiment of the present invention, an M2M node constituting an M2M system, which includes a request node for transmitting a search request message and a target node for providing a search result, comprises: a discovery unit for receiving the search request message from the request node and receiving, from the target node, the search result including an application resource; a communication management/delivery handling unit for transmitting the received message to the target node when the received message indicates a search of available applications; and a control unit for controlling the discovery unit and the communication management/delivery handling unit so as to perform the search by using the state information of the application resource.

18 Claims, 22 Drawing Sheets

(30) Foreign Application Priority Data

Dec. 16, 2013 (KR) ........................ 10-2013-0156189
Feb. 21, 2014 (KR) ........................ 10-2014-0020263

(56) References Cited

U.S. PATENT DOCUMENTS

| | | |
|---|---|---|
| 2008/0313315 A1 | 12/2008 | Karaoguz et al. |
| 2009/0021413 A1 | 1/2009 | Walley et al. |
| 2009/0022091 A1 | 1/2009 | Buer et al. |
| 2009/0022092 A1 | 1/2009 | Macinnis et al. |
| 2009/0022096 A1 | 1/2009 | Walley et al. |
| 2009/0022117 A1 | 1/2009 | Quigley et al. |
| 2009/0022118 A1 | 1/2009 | Behzad et al. |
| 2009/0022119 A1 | 1/2009 | Buer et al. |
| 2009/0023393 A1 | 1/2009 | Behzad et al. |
| 2009/0023422 A1 | 1/2009 | Macinnis et al. |
| 2009/0023428 A1 | 1/2009 | Behzad et al. |
| 2009/0023432 A1 | 1/2009 | Macinnis et al. |
| 2009/0023433 A1 | 1/2009 | Walley et al. |
| 2009/0023457 A1 | 1/2009 | Buer et al. |
| 2009/0024687 A1 | 1/2009 | Quigley et al. |
| 2009/0025081 A1 | 1/2009 | Quigley et al. |
| 2011/0153634 A1 | 6/2011 | Chu et al. |
| 2011/0216671 A1 | 9/2011 | Walley et al. |
| 2012/0066221 A1 | 3/2012 | Behzad et al. |
| 2012/0272300 A1 | 10/2012 | Quigley et al. |
| 2012/0297023 A1 | 11/2012 | Buer et al. |
| 2013/0034045 A1 | 2/2013 | Kwon et al. |
| 2013/0094401 A1 | 4/2013 | Macinnis et al. |
| 2013/0102318 A1 | 4/2013 | Quigley et al. |
| 2013/0239118 A1 | 9/2013 | Behzad et al. |
| 2013/0262491 A1 | 10/2013 | Macinnis et al. |
| 2014/0016608 A1 | 1/2014 | Buer et al. |
| 2014/0068004 A1 | 3/2014 | Buer et al. |
| 2015/0019717 A1* | 1/2015 | Li ........................ H04L 67/1085 709/224 |
| 2015/0087227 A1 | 3/2015 | Macinnis et al. |
| 2015/0124696 A1 | 5/2015 | Kwon et al. |
| 2015/0237608 A1 | 8/2015 | Buer et al. |
| 2015/0245404 A1 | 8/2015 | Quigley et al. |
| 2016/0080928 A1 | 3/2016 | Karaoguz et al. |
| 2016/0132586 A1 | 5/2016 | Macinnis et al. |

* cited by examiner

FIG.8

| Child Resource Name | Child Resource Type | Multiplicity | Description |
|---|---|---|---|
| [variable] | <group> | 0..1 | Information on group |
| [variable] | <subscription> | 0..n | Information on subscription |

FIG.9

| Attribute Name | Multiplicity | RW/RO/WO | Description |
|---|---|---|---|
| expirationTime | 1 | RW | Application service expiration time |
| accessRightID | 1 | RW | Application access right |
| creationTime | 1 | RW | Application creation time |
| lastModifiedTime | 1 | RO | Application resource last modified time |
| creator | 1 | RW | Creator |
| lifeCycleStatus | 1 | RW | Current lifetime state information of application |
| searchStrings | 0..1 | RO | Application search keywords |
| reachabilityStatus | 1 | RW | State information on whether or not a message can be received from the CSE |
| AppId | 1 | RW | Application ID |
| App-Inst-Id | 0..1 | RW | Application instance operated in the execution environment |

FIG.16

| | | 1600 |
|---|---|---|
| op | RETRIEVE | |
| fr | IN 1 CSE-ID | |
| to | MN 1 CSE-ID | |
| cn | Search Keyword: Application ID or Group URI or A set of searchString in application resource.<br>Originator LOC: (10, 30)<br>Application Resource Status: Start<br>Application Resource Reachability: OK<br>Search Method: Broadcast | |

FIG.17

| op | RETRIEVE |
|---|---|
| fr | MN 1 CSE-ID |
| mi | rt= <application resource> |
| cn | Search Keyword: Application ID or Group URI or A set of searchString in application resource. |

| op | RETRIEVE |
|---|---|
| fr | Originator CSE-ID |
| to | ASN 2 CSE-ID |
| mi | rt = <application resource><br>da = ON or OFF |
| cn | Search Keyword: Application URI or Group URI or A set of searchString in application resource. |

| Attribute Name | Value |
|---|---|
| expirationTime | 2013-12-31 23:59:59 |
| accessRightID | ... |
| creationTime | 2013-12-01 01:01:01 |
| lastModifiedTime | 2013-12-01 01:01:02 |
| creator | LocalCSE |
| lifeCycleStatus | Start |
| searchStrings | MS Office, MS Office Excel, Excel |
| reachabilityStatus | OK |
| AppId | MS_Office_Excel_2010 |
| App-Inst-Id | oneM2M-AppId-Instance1 |

ID
METHOD AND DEVICE FOR SEARCHING FOR AVAILABLE DEVICE IN M2M ENVIRONMENT

CROSS REFERENCE TO RELATED APPLICATIONS

This application is a National Stage Patent Application of PCT International Patent Application No. PCT/KR2014/011412 (filed on Nov. 26, 2014) under 35 U.S.C. § 371, which claims priority to Korean Patent Application Nos. 10-2013-0147776 (filed on Nov. 29, 2013), 10-2013-0154181 (filed on Dec. 11, 2013), 10-2013-0156189 (filed on Dec. 16, 2013), and 10-2014-0020263 (filed on Feb. 21, 2014), the teachings of which are incorporated herein in their entireties by reference.

TECHNICAL FIELD

The present invention relates to M2M (Machine to Machine Communication) technology, and, more particularly, to a method of searching for available devices by using network technology, and further relates to a device thereof.

BACKGROUND ART

Machine to machine communication (M2M) {or Machine type communication (MTC), Smart Device communication, Machine oriented communication, or Internet of Things} refers to all communication schemes in which communication is performed without intervention from people. Recently, the discussion about the M2M has been made in oneM2M. However, technical factors that satisfy the architecture and requirements of oneM2M have not yet been proposed.

DETAILED DESCRIPTION OF THE INVENTION

Technical Problem

In the typical M2M environment, when a request for searching for a specific device, which is desired to be used, is made to a search target node, a middle node, or an infrastructure node, it is impossible to figure out whether or not the devices are available, which are searched for by the search target node, the middle node, or the infrastructure node. According to this, since it is impossible to know whether or not a specific device is available when searching the specific device for usage, even though the device is discovered, the device cannot be used in some cases. The present invention is intended to know the availability of a device to be searched for at the time when searching for and using the device, thereby quickly finding and providing the available device in an emergency situation, as well as in a normal situation, in the M2M communication.

Technical Solution

According to an embodiment of the present invention, an M2M node constituting an M2M system that includes a request node for transmitting a search request message and a target node for providing a search result may include: a discovery unit configured to receive the search request message from the request node and configured to receive the search result containing an application resource from the target node; a communication management/delivery handling unit configured to deliver the received message to the target node if the received message indicates a search of available applications; and a control unit configured to control the discovery unit and the communication management/delivery handling unit to perform the search by using state information of the application resource.

According to another embodiment of the present invention, an M2M node for receiving a search request message and providing a search result may include: a communication management/delivery handling unit configured to receive the search request message; a data management and repository configured to identify the installation or availability of the application if the received message indicates a search of available applications; and a control unit configured to control the communication management/delivery handling unit to transmit state information of the application resource to the node that has transmitted the search request message in the case where the application has been installed and the application is available.

According to another embodiment of the present invention, an M2M system including a search node, a target node, and a request node for transmitting/receiving a request message and performing a search may include: a request node configured to create a search request message of an application resource and configured to transmit the same to the search node; a search node configured to perform a search by using state information of the application resource if the received message indicates a search of available applications, configured to deliver the received message to the target node, and configured to receive a search result containing the application resource from the target node; and a target node configured to perform a search by using the state information of the application resource.

According to another embodiment of the present invention, a method of searching for available devices in the M2M environment may include: letting a search node receive a search request message of an application resource; letting the search node deliver the search request message to a target node if the search request message indicates a search of available applications, and letting the search node receive a search result containing the application resource from the target node, wherein the search node or the target node performs the search by using state information of the application resource.

Advantageous Effects

The present invention can provide a method for selecting available devices at a search request time according to a device search request in order to thereby select a device having an available application service and in order to thereby provide a service in real time during the M2M communication.

BRIEF DESCRIPTION OF THE DRAWINGS

FIG. 8 is a view for explaining a sub-resource form constituting an application resource, according to an embodiment of the present invention.

FIG. 9 is a view for explaining the properties constituting the application resource, according to an embodiment of the present invention.

FIGS. 14 to 19 are views showing the configuration of a message, according to an embodiment of the present invention.

FIG. 20 is a view showing an example of the responded application resource, according to an embodiment of the present invention.

MODE FOR CARRYING OUT THE INVENTION

Figure 1:
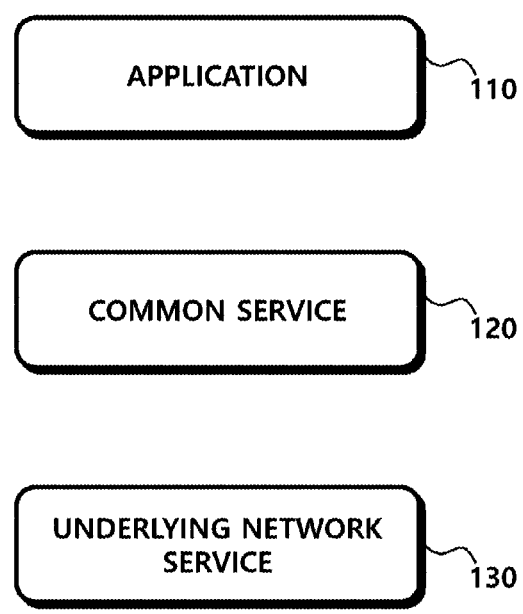
FIG. 1 is a view showing the configuration of a system constituting the present invention.

Hereinafter, some embodiments of the present invention will be described in detail through illustrative drawings. With regard to the reference numerals for the elements of the drawings, it should be noted that the same reference numeral denotes the same element throughout the drawings. In addition, if it is determined that the detailed description of the related conventional configurations or functions obscures the subject matter of the present invention in the description, the detailed description will be omitted.

In addition, the first, the second, A, B, (a), or (b) may be used to describe the elements of the present invention. These terms are intended to separate a specific element from other elements, but are not intended to limit the properties, sequence, or order of the corresponding element. In the case where a certain element is expressed to be "connected", "coupled", or "fastened" to another element, the element may be directly connected, or coupled, to another element, and it should be understood that another element can be "connected", "coupled", or "fastened" between them.

The embodiments of the present invention will be described in relation to the M2M (Machine to Machine) communication. The M2M communication may be variously referred to as MTC (Machine Type Communication), IoT (Internet of Things), Smart Device Communication (SDC), or Machine Oriented Communication. Recently, oneM2M has presented a number of technical matters in relation to the M2M communication. The M2M communication refers to a variety of communication in which communication can be performed without intervention from people. The M2M communication encompasses an energy sector, an enterprise sector, a healthcare sector, a public service sector, a residential sector, a retail sector, a transportation sector, and other sectors. The present invention includes the sectors above and may be applied to other sectors.

In the present invention, identification means a process of recognizing an entity in a particular domain to be distinct from other entities. Authentication means a process of determining an identifier of an entity or establishing the information source. Authorization means the grant of a right, and includes the grant based on the access right. Confidentiality refers to a feature that prevents information from being used by an unauthorized entity or process, or that prevents information from being opened to the public. Credentials mean a data object that is used to uniquely identify the entity in the security procedure. Encryption means a process of converting plaintext into ciphertext by using cryptographic algorithms and keys. Integrity means the guarantee of accuracy and completeness for processing information and methods. Key is a parameter that is used in combination with the encryption algorithm. The entity having key information can reproduce the key or can conversely execute the encryption process, and the entity having no key information cannot conduct the reproduction or the converse execution above. Mutual authentication means entity authentication to ensure the mutual identity. Privacy is a personal right that controls or influences related information, and may be collected and stored by means of a target to be opened to the public. Repudiation means a denial of an event or an action requested by the entity. Being secure means that it is not vulnerable to any attack, or it withstands the attack, and it restores the damages incurred by the attack in spite of the vulnerability. Security refers to the system state resulting from the operation of generating and maintaining a measure to protect the system. Sensitive data refers to the classification of data by the person concerned, which causes problems if it is unintentionally known or modified without the consent of the person concerned. Subscription refers to the classification of agreement between a provider and a subscriber for the usage (consumption) of services for a specific period of time. Subscription generally means a commercial agreement. Trust means a relationship between two elements, in which the element x trusts the element y only when the element x is convinced that the element y will operate in a predetermined manner without infringing on a given security policy, and the trust has a relationship with activities and a security policy. Verification means confirmation by providing objective evidence to satisfy specific requirements.

An M2M application refers to an application that operates service logic, and uses an M2M common service by using a specific open type of interface in oneM2M. An M2M application infrastructure node is equipment (a physical group of servers of an M2M application service provider). The M2M application infrastructure node manages data and executes a function of adjusting M2M application services. An application infrastructure node hosts one or more M2M applications.

The M2M application service is implemented through M2M application service logic, and is operated by an M2M application service provider or a user. The M2M application service provider means an entity that provides users with M2M application services. An M2M area network is a type of underlying network, and provides a data transport service between an M2M gateway, an M2M device, and sensing/ actuation equipment. An M2M LAN (Local Area Network) may use heterogeneous communication techniques, and may, or may not, support the IP access.

A field domain is comprised of an M2M gateway, an M2M device, sensing/actuation equipment, and an M2M area network. An infrastructure domain is comprised of an application infrastructure domain and a service infrastructure domain. The sensing/actuation equipment may sense a physical environment, or may provide an effective function by interaction with one or more M2M application services. It interacts with the M2M system, but does not host the M2M application. The M2M solution means a system that is implemented or deployed to satisfy the following criteria, and the M2M solution meets end-to-end M2M communication requirements of a specific user. An M2M system means a system that implements or deploys the M2M solution. An underlying network means functions, networks, busses, or other techniques for data transmission/connection services.

FIG. 1 is a view showing the configuration of a system constituting the present invention. FIG. 1 is comprised of an application 110, a common service 120, and an underlying network service 130. They constitute an application layer, a common service layer, and a network service layer, respectively. The application layer includes business logic and operational logic, which are related to the oneM2M application. The common service layer is comprised of oneM2M service functions to operate the oneM2M application. To this end, management, discovery, and policy enforcement are applied.

A common service entity is an instantiated example of the common service function. The common service entity provides a subset of a common service function, which is to be used and shared by the M2M application. The common service entity uses functions of the underlying network and interacts with other common service entities in order to thereby implement services.

Figure 2:
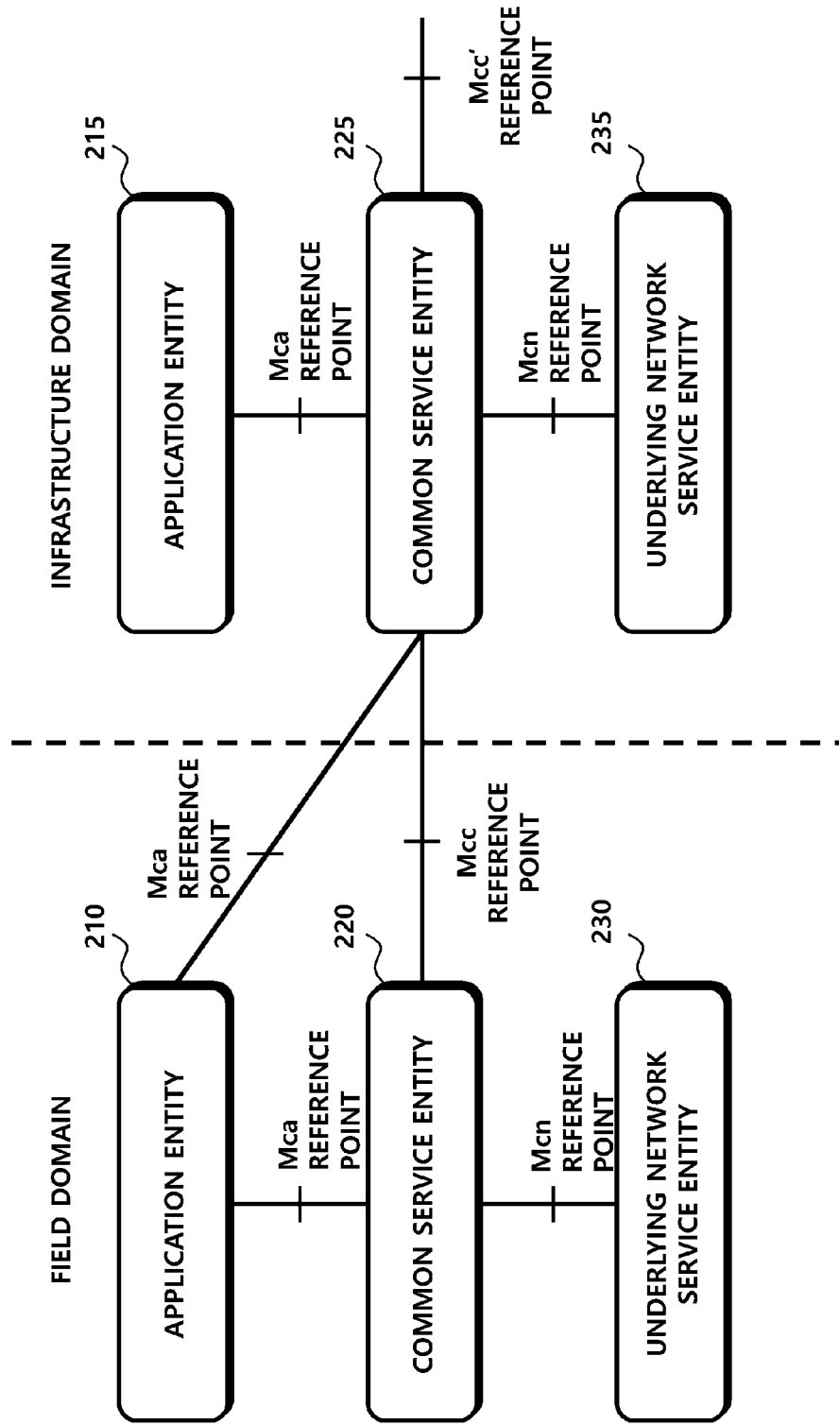
FIG. 2 is a view showing a system illustrated in terms of a function of an upper level, which constitutes the present invention.

FIG. 2 is a view showing a system illustrated in terms of a function of an upper level, which constitutes the present invention. Referring to FIG. 2, respective elements constituting a field domain and an infrastructure domain will be described as follows. An application entity (AE) 210 or 215 provides application logic for the end-to-end M2M solution. For example, it may be a fleet tracking application for vehicles, a remote blood sugar monitoring application, or a remote power metering and controlling application. A common service entity (CSE) 220 or 225 is a group of service functions that are used in common in the M2M environment. The service function is revealed to be a different function through the reference points Mca and Mcc, and uses the underlying network service by using the reference point Mcn. It may be M2M subscription management, a location service, or the like. Sub-functions provided by the CSE may be logically understood to be common service functions (CSFs). Some of the CSFs in the CSE of the oneM2M node may be mandatory, and the others thereof may be optional. Similarly, sub-functions in the CSF may be mandatory or optional as well.

An underlying network service function (NSF) 230 or 235 provides services to the common service entity. For example, the services include device management, a location service, and device triggering.

The reference points are supported by the common service entity (CSE), and the Mca reference point indicates a communication flow between the application entity and the common service entity. The Mcc reference point indicates a communication flow between two common service entities.

The Mcn reference point indicates a communication flow between the common service entity and one network service entity.

More specifically, the Mca reference point enables one application entity (AE) to use services that are supported by the common service entity. Services provided through the Mca reference point are dependent on the functions provided by the common service entity, and the application entity and the common service entity may exist in the same physical entity or may exist separately in different physical entities.

The Mcc reference point allows the common service entity, which desires to use services of other common service entities that provide necessary functions, to use the services. The services provided through the Mcc reference point are dependent on the functions that are provided by the common service entity. The Mcc reference point may be supported between different M2M nodes.

The Mcn reference point allows the common service entity, which desires to use the service entity of the underlying network providing necessary functions, to use the same, and it provides services except for a transport and connectivity service. The instance of the Mcn reference point is implemented to be dependent on the services that are provided by the underlying network. The information exchange between two physical M2M nodes may use the transport and connectivity service of the underlying network that provides basic services.

The Mcc' reference point indicates a communication flow between the CSEs.

Figure 3:
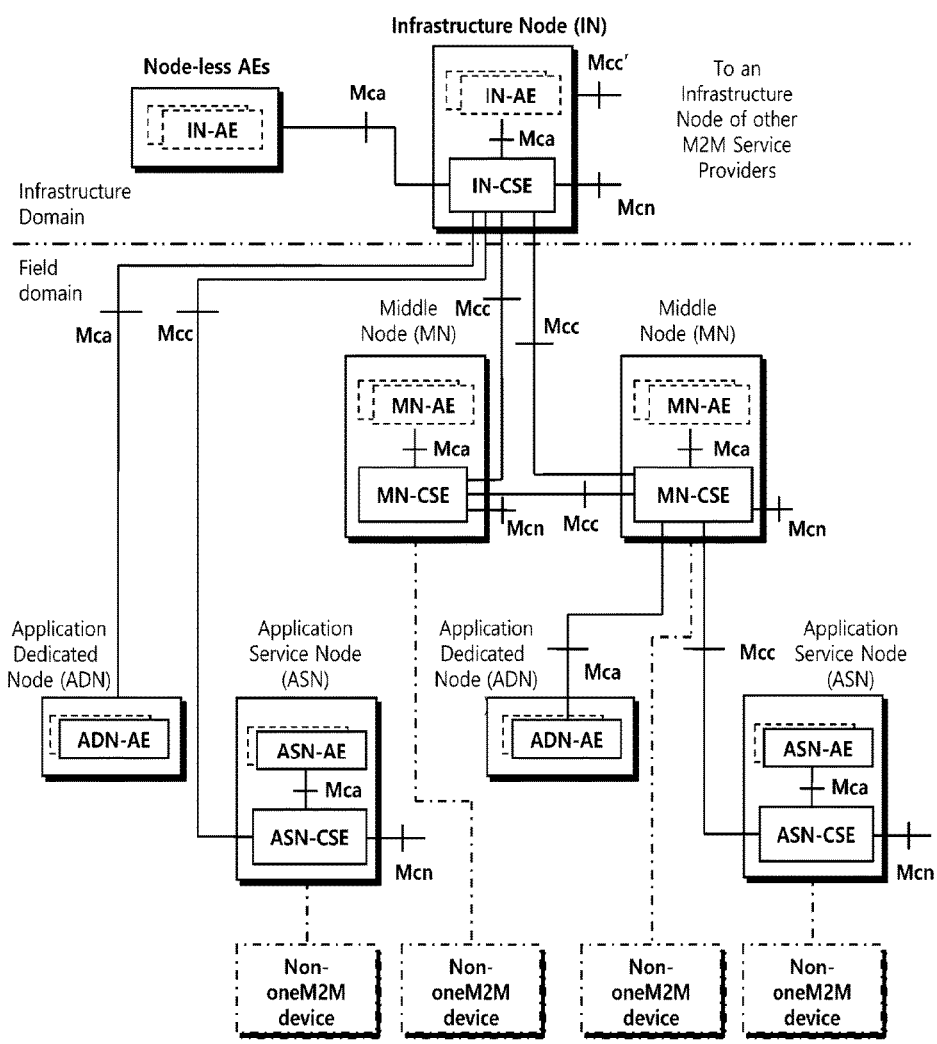
FIG. 3 is a view showing a functional architecture constituting the present invention.

FIG. 3 is a view showing a functional architecture constituting the present invention. In the functional architecture of FIG. 3, AE denotes the application entity, and CSE denotes the common service entity. IN, MN, ADN, and ASN in front of AE and CSE stand for an infrastructure node (IN), a middle node (MN), an application dedicated node (ADN), and an application service node (ASN), respectively. The CSEs of different nodes are not the same, and they depend on the services supported by the CSE in the node.

The application dedicated node (ADN) includes one or more application entities (AE), but does not include the common service entity (CSE). The application dedicated node communicates with the middle node or the infrastructure node by using the Mca reference point.

The application service node (ASN) includes one common service entity (CSE), and one or more application entities (AEs). The application service node performs communication through the Mcc reference point as follows. It communicates with one middle node or communicates with one infrastructure node. The communication method may be performed with respect to only one middle node or with respect to only one infrastructure node.

The middle node (MN) includes one common service entity (CSE), and includes, or does not include, one or more application entities (AEs). The middle node communicates with the IN or the MN at least by using the Mcc, or communicates with the IN/MN/ASN by using the Mcc or by using the ADN and Mca.

The infrastructure node includes one common service entity (CSE), and includes, or does not include, one or more application entities (AEs). The middle node communicates with two or more nodes by using each Mcc reference point as follows. It communicates with one or more middle nodes and/or with one or more application service nodes. In addition, the infrastructure node may communicate with one or more application dedicated nodes by using the Mca reference point.

Figure 4:
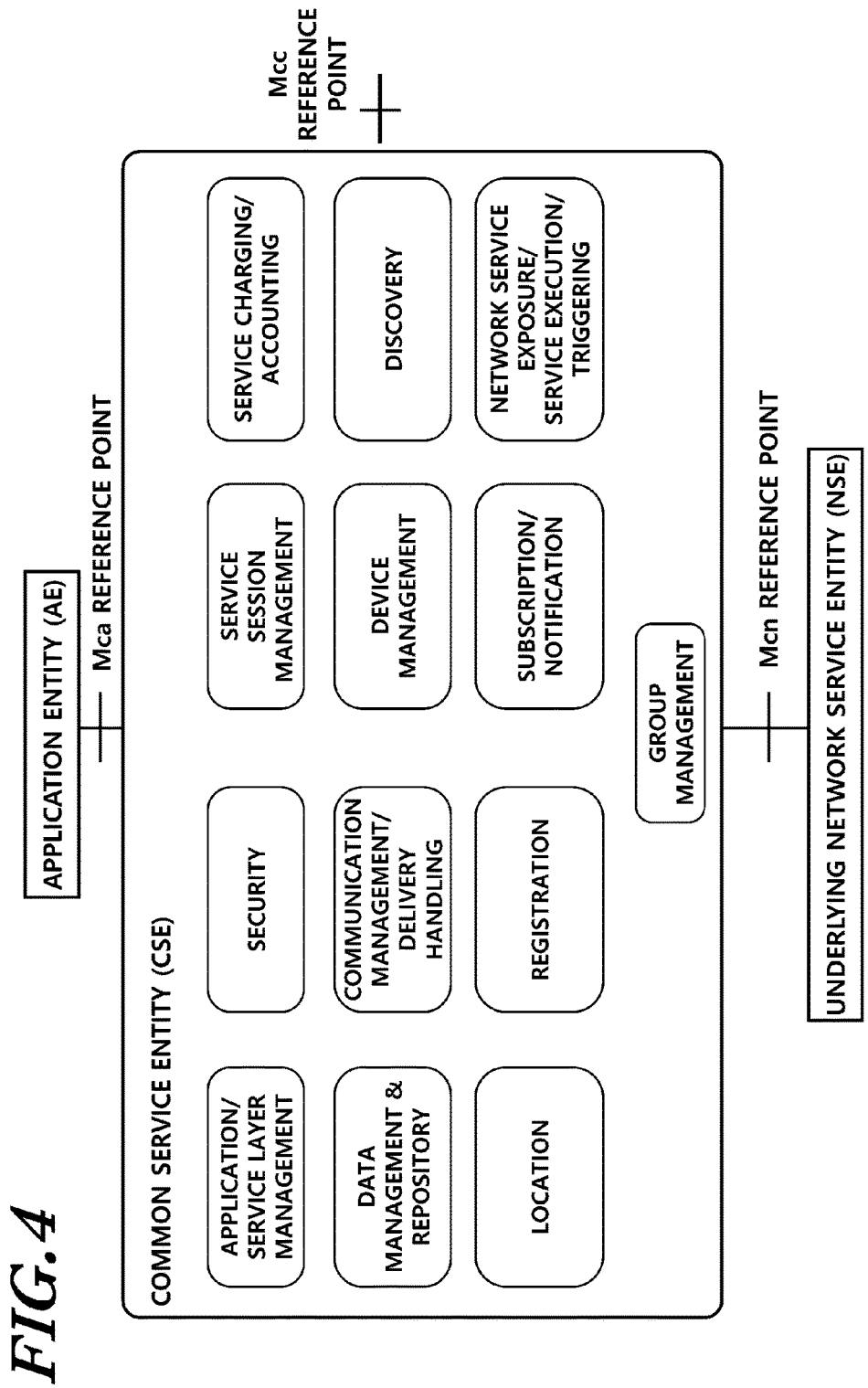
FIG. 4 is a view constituting a common service entity, according to an embodiment of the present invention.

FIG. 4 is a view constituting a common service entity, according to an embodiment of the present invention. FIG. 4 includes a processing function of identification information.

As shown in FIG. 4, the common service entity provides a function of:

addressing and identifying; application and service layer management; data management and repository; location; security; communication management/delivery handling; registration; service session management; device management; subscription/notification; connectivity management; discovery; service charging/accounting; network service exposure/service execution and triggering; or group management.

In addition to the functions above, semantics, data analysis, application enablement, or network service function management may also be included.

Each function will be described below.

The AID (addressing and identification) provides information that is necessary for identifying and controlling physical and logical resources in the M2M environment. The logical resources are entities that are related to software, such as the application, the CSE, or data. The physical resources are hardware-related entities that are related to the underlying network and M2M devices. The AID CSF supports the combination of the provisioning and M2M application of different types of M2M identifiers, the CSE, the M2M devices, and identifiers.

The ASM (application and service layer management) manages the AE and the CSE of the ADN, the ASN, the MN, or the IN, and the ASM includes the configuration of the CSE, troubleshooting, an upgrading function, and the upgrading of the AE.

The CMDH (communication management and delivery handling) is responsible for communication between the CSE, the AE, and the NSE. The CMDH manages: the time when communication is established; the communication type to be used (CSE-CSE communication); the time when communication is required; the time when communication is approved; and the storing of a communication request in the case where communication delivery is delayed. The CMDH is performed according to a provisioning policy that is specialized in each communication request and delivery handling parameters. The underlying network may support the same delivery handling function in the case of communication by using the underlying network data transfer service. In this case, the CMDH may use the underlying network, and may operate as a front end to access the same transfer handling function in the underlying network.

The DMR (data management and repository) allows the M2M application to exchange data with other entities. The DMR CSF provides a data storage space and a function of adjusting the same. In addition, the DMR CSF has a function of: collecting and combining a massive amount of data; transforming data in a particular format; or storing data for the analysis and semantic processing. "Data" may refer to raw data that is transparently extracted from the M2M device, or may refer to processed data that is computed or combined by the M2M entities. The collection of a large amount of data is implemented by a big data storage function that is known.

The DMG (device management) CSF manages functions of devices in the MN, the device nodes (ADN and ASN), and the M2M area network. The AE may manage the device capability of the node by using the services provided by the DMG CSF, and the AE does not need to manage specific technical knowledge. The device management can be made to provide one or more functions as follows. The functions include: installation and setting of the application software; configuration setting and provisioning; updating firmware; logging, monitoring, and analyzing; topology management of the area network; and a device of the area network management.

The DIS (discovery) CSF searches for information corresponding to a request from an originator (for example, supported properties and resources) within an allowed right (including the allowed right in the M2M service subscription) and a given range. The originator may be an application or another CSE. The search may be performed with respect to a single CSE or with respect to a number of CSEs. The discovery result is returned to the originator.

The GMG (management group) handles a group related to a request. The request is transmitted in order to manage the membership between the groups, and it conducts a bulk operation that is supported by a group. In the case of adding or deleting a member to, or from, the group, it is necessary to check whether or not the member is adapted to the purpose of the group. The bulk operation includes reading, writing, subscription, notification, and device management. The request or subscription is made through the group, and the group takes charge of the combination of the request and the notification. Members of the group have the same role for the access right to the resources. In this case, the access control is performed by the group. In the case where the underlying network provides broadcasting and multicasting functions, the GMG CSF is required to use the functions.

The LOC (location) CSF enables the M2M AE to obtain geographical location information of the M2M node (for example, the ASN and the MN) for location-based services. This location information may be requested by the M2M AEs that belong to the same M2M node or belong to different M2M nodes.

The NSSE (network service exposure or service execution and triggering) CSF manages communication with the underlying network in order to access a network service function through the Mcn reference point in an available or supportable manner in response to a service request from the M2M system instead of the M2M application. The NSSE CSF conceals other CSFs and AEs from a specific technique and mechanism supported by the underlying network. The network service functions provided by the underlying network include triggering device, transferring small data, notifying of the location, setting a policy rule, enquiring the location, providing an IMS service, or managing devices, but are not limited thereto. The functions do not include a general transfer service.

The REG (registration) handles the application or other CSEs to be registered in the CSE, which is intended to permit the registration of the entity that desires to use the services provided by the CSE. The REG CSF manages the registration of the properties/attributes of a device as well as the registration of the device for the CSE.

The SEC (security) provides a sensitive data handling function, a security operating function, a security combination setting function, and an authorization and access control function, of an identification protection function. The sensitive data handling function provided by the SEC CSF protects local credentials that require security in the storage and manipulation.

The SCA (service charging and accounting) provides a charging function for a service layer. It supports different charging models that include online charging and offline charging. The SCA CSF: secures chargeable events; stores information; and creates charging records and charging information. The SCA CSF may interact with a charging system of the underlying network. However, the CSF SCA is responsible for creating and recording the charging information of the final service level. The CSF SCA of the infrastructure node or a service layer charging server takes charge of handling the charging information for charging.

The SSM (service session management) CSF manages an M2M service session that is an end-to-end service layer connection. The SSM CSF manages M2M service sessions between the M2M applications, between the M2M application and the CSE, or between the CSEs. The management of the M2M service session includes the management of the session state, the session authentication and establishment, an underlying network connection and the management of a service in relation to the session, the adjustment of session extension of a multi-hop CSE of the CSE, the exchange of information between the session ends, and the termination of the session. In the given M2M service session, the SSM CSF uses the CMDH CSF in the local CSE in order to transmit/receive messages to/from the CSE or the application of the next hop. The SSM CSF uses the SEC CSF for security credentials of session-participants and the session management related to authentication. The SSM CSF creates charging events that are specialized in the session, and communicates with the SCA CSF in the local CSE as well.

The SUB (subscription and notification) provides a notification to maintain the subscription, and tracks a change in the resources (for example, deletion of a resource). The subscription of a resource is initiated by the AE or the CSE, and an access right is granted by the hosting CSE. If there is a change in the resource during the active subscription, the hosting CSE transmits a notification to the address desired by a resource subscriber.

FIG. 4 and the description thereof relate to the embodiments for implementing the common service entity, but the present invention is not limited thereto.

Meanwhile, identifiers are required in order to implement the present invention, as follows. M2M identifiers include M2M-SP-ID (M2M Service Provider Identifier), App-Inst-ID (Application Instance Identifier), App-ID (Application Identifier), CSE-ID (CSE Identifier), M2M-Node-ID (M2M Node Identifier/Device Identifier), M2M-Sub-ID (M2M Service Subscription Identifier), M2M-Request-ID (Request Identifier), or the like.

Hereinafter, an M2M framework, an M2M system, and an M2M architecture will be interchangeably used.

The M2M service provider should be uniquely identified by the M2M-SP-ID. The M2M-SP-ID is a static value that is allocated to the service provider. The App-Inst-ID is an identifier that uniquely identifies an M2M application instance that exists in the M2M node, or is an identifier that identifies an M2M application instance that interacts with the M2M node. The App-Inst-ID is used for identifying an application that is generated in the M2M system or interaction with the application. The M2M service provider should ensure the globally unique App-Inst-ID, and the App-Inst-ID contains the application identifier (App-ID).

The CSE-ID is a unique identifier that identifies the CSE, and is used when the CSE is instantiated in the M2M node in the M2M system. The CSE-ID is used to identify the CSE in all interactions from, or to, the CSE in the M2M system.

The M2M-Node-ID uniquely identifies the M2M node that hosts the CSE and/or the application. The M2M service provider configures the CSE-ID and the M2M-Node-ID to be the same value in the M2M system. The M2M-Node-ID allows the service provider to bind the CSE-ID and a specific M2M node.

The M2M-Sub-ID enables the M2M service provider to bind the application, the M2M node, and the CSEs into a specific M2M service subscription. Thus, the M2M-Sub-ID may: belong to the M2M service provider; identify the subscription with respect to the M2M service provider; enable communication with the M2M service provider; be distinguished from an M2M underlying network subscription identifier; and be changed according to a change in the M2M service provider. There may be a plurality of M2M-Sub-IDs for the M2M underlying network.

The M2M-Request-ID (M2M request identifier) is an identifier that tracks, in the end-to-end manner, a request that is originated from the application through the Mca reference point or from the CSE through the Mcc and Mcn reference points. This is also included in a response to the request. In order for the application to track a request and a corresponding response through the Mca reference point, the application should include a separate application request identifier in each request when making a request to the CSE through the Mca reference point.

The M2M-Ext-ID (M2M external identifier) is an identifier used by the M2M SP, and is used when the underlying network requests a service that is targeted at the CSE identified by the CSE-ID. The M2M-Ext-ID allows the underlying network to identify the M2M device that is combined with the CSE-ID according to a service request. As a result, the underlying network maps the M2M-Ext-ID with an underlying network identifier that is allocated to the target M2M device. In addition, the M2M SP should maintain the combination between the CSE-ID, the M2M-Ext-ID, and the identification information of the underlying network.

Figure 5:
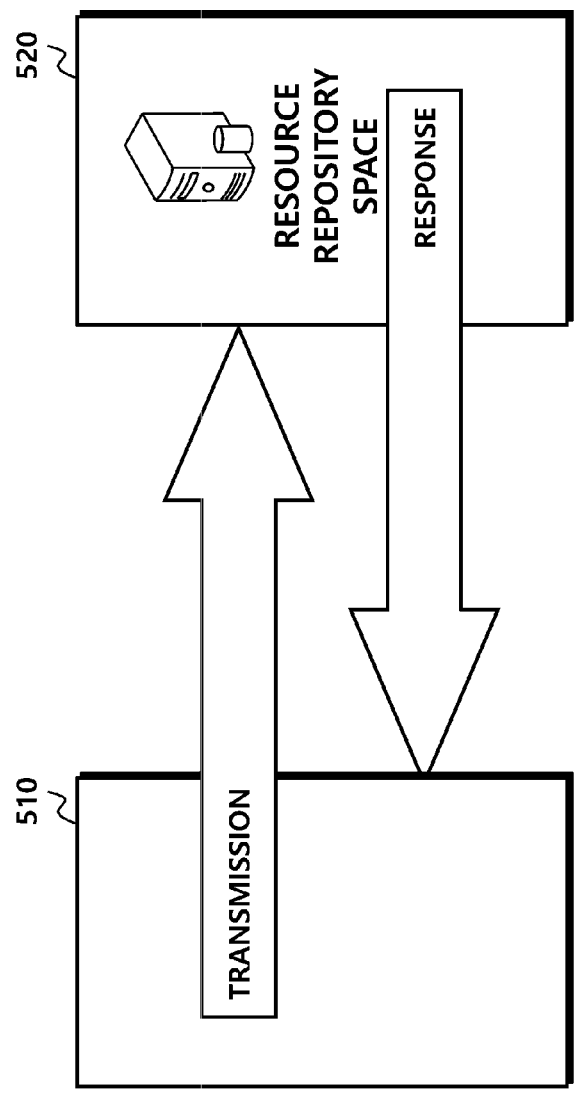
FIG. 5 is a view showing a communication flow at a reference point, according to an embodiment of the present invention.

FIG. 5 is a view showing a communication flow at a reference point, according to an embodiment of the present invention.

510 is an originator and 520 is a receiver. The exchange of information between the two entities is performed through the Mca reference point between the application and the CSE, or through the Mcc reference point between the CSEs. In addition, the exchange of information is made by the sending and responding. A sending request is made by the originator 510 to the receiver 520, and includes the following information.

"op" is an operation to be executed, and includes C (Create), R (Retrieve), U (Update), and D (Delete). "to" is the address of a target resource, and "fr" refers to the address of a resource indicating the originator. "hd" is a header including meta information about the sending request, and "cn" refers to the content to be sent.

Figure 6:
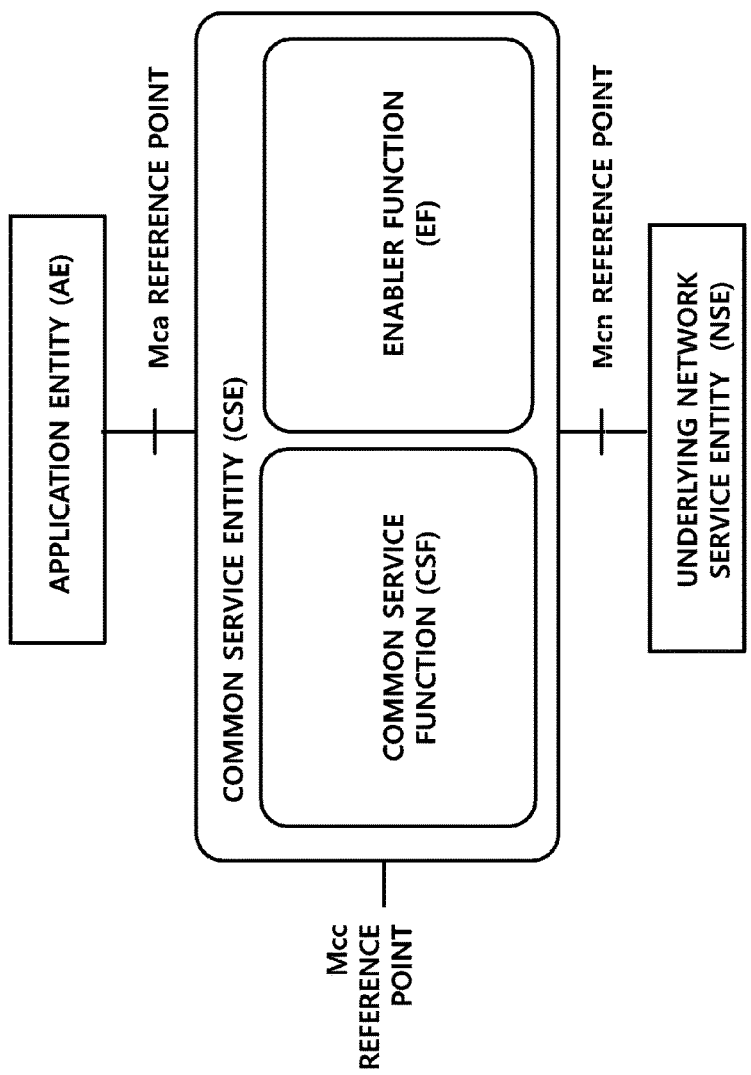
FIG. 6 is a view showing the architecture of a common service entity to which an embodiment of the present invention is applied.

FIG. 6 is a view showing the architecture of a common service entity to which an embodiment of the present invention is applied. The common service entity contains a set of common service functions and a set of enabler functions. The enabler function is comprised of a service extension enabler and other enablers, and the service extension enabler enables the CSE to provide the M2M service through the Mca and Mcc reference points. The service extension enabler provides the following functions. It may i) check module authentication, ii) check node resources, iii) check interoperability with existing modules, iv) check a policy and rights to determine how to handle conflicts (e.g., a new module may not be registered or an existing module may be deregistered), v) register a new module, vi) add a new service according to the addition of a new model to a service list, vii) modify the API by reflecting a new service capability, and viii) modify inter-module communications to incorporate a new module.

oneM2M suggests requirements for implementing the system (such as, overall system requirements, management requirements, data model and semantic requirements, security requirements, charging requirements, or operational requirements).

In the present specification, the description will be made based on the M2M, and particularly, based on oneM2M. However, the description is not limited to the M2M, and it may be applied to all the systems and structures that provide the M2M communication, and may be further applied to communications thereof.

As a precondition to perform the M2M communication in the oneM2M environment, the local CSE and the application are required to be registered to each other. At this time, the application instance is generated, and this information is stored in the form of an application resource. Elements of the application resource contain state information on the application, and actually, when the local CSE communicates with the application instance, the availability thereof may be identified with reference to the application resource information. Accordingly, the present invention proposes a method for available devices based on the application resource information, and proposes a method by using a search range and a method by using only a search target.

Figure 7:
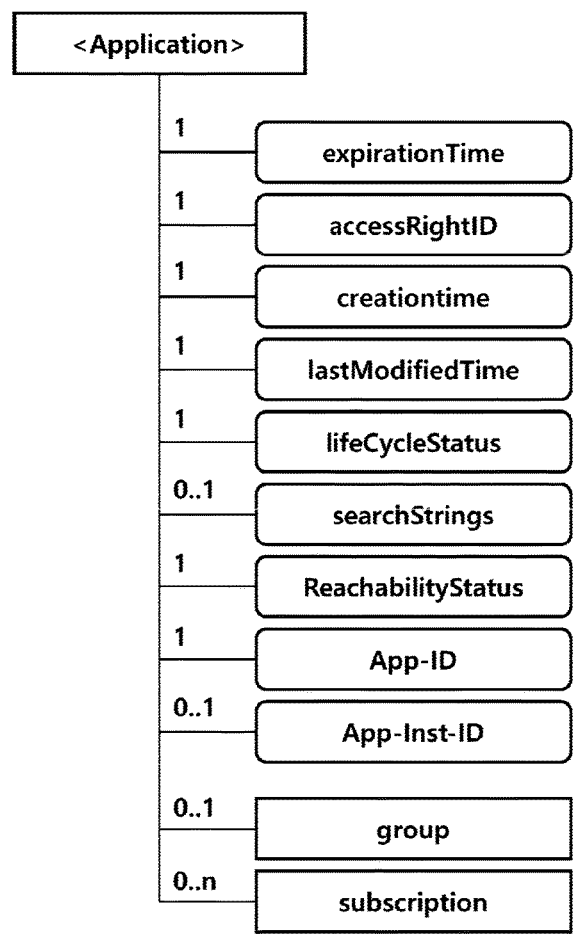
FIG. 7 is a configuration diagram of an application resource, according to an embodiment of the present invention.

FIG. 7 is a configuration diagram of an application resource, according to an embodiment of the present invention.

The application resource contains, as attribute values, expirationTime, accessRightID, creationTime, lastModificationTime, creator, lifeCycleStatus, searchStrings, ReachabilityStatus, AppId, App-Inst-Id, or the like, and contains, as sub-resources, Group, Subscription Resource, or the like.

The application resource stores information on the application, and is created as a result of an operation in which the application instance performs successful registration with the local CSE. The application resource may apply CRUD (Create, Retrieve, Update, and Delete) operations. That is, it may be created by an application creation request, and may be searched for. In addition, the attributes thereof may be updated or deleted. Since the attribute expirationTime is designated in the application resource, when the time expires, the application may be deleted. In addition, the lifeCycleStatus in the application elements has status values for the process from the creation of the application to the stop thereof. For example, the lifeCycleStatus may have values of Deployed, Install, Start, Stop, or Uninstall, and may include all values corresponding to the status from the installation of the application to the removal thereof. Alternatively, it may have the state of Idle, Start, or Stop from the execution of the application to the stop thereof. In addition, the element "ReachabilityStatus" indicates whether or not the application instance can receive a message that is transmitted from the local CSE, and if it has a value of "OK" or "True", which means that a message can be received, it shows the state in which the corresponding application instance can receive the message. The application elements lifeCycleStatus and ReachabilityStatus show the current state of the application, so available application instances may be selected by using the same. Therefore, if a search operation is performed while focusing on the availability of the application, the values of lifeCycleStatus and ReachabilityStatus may be identified. Furthermore, the expirationTime may be identified during the search operation as well. If the time expires, the application corresponding thereto may be removed from the search result, and even when the time is about to expire, the application may be excluded from the search result. For example, if it is set to expire within 10 minutes, the application that requires an hour for the execution may not be included in the search result for applications.

The application resource may have, as sub-resources, a group resource and a subscription resource, and the application may belong to a specific group and may be subscribed.

FIG. 8 shows sub-resource elements of the application resource, according to the embodiment of the present invention.

The group resource represents a group to which the application belongs. In some cases, there is no group, and if the application belongs to a group, the group name may be determined. In addition, the application resource may be created by a subscription request.

FIG. 9 shows details of attribute values of the application resource, according to the embodiment of the present invention.

The expirationTime indicates the expiration time of the application, and when the configured time expires, the application may be stopped or deleted. The expiration time may be used for a search criterion in relation to the availability of the application in the search operation. As described above, in the case of searching for applications to be used for more than one hour, the application, of which the expirationTime is configured to be less than one hour, may be excluded from the search result. The accessRightID denotes the right to access the application. When a CRUD request for the application is received, the access right is identified first through the accessRightID. The creationTime refers to the creation time of the application resource, and the lastModifiedTime is recorded when the application resource is modified. The creator refers to an application creator, and the lifeCycleStatus has a value of the current lifetime state of the application. The searchStrings may contain keywords for the application resource, and may have a value to search for the application resource. The ReachabilityStatus is a value that indicates whether or not the application instance can receive a message from the local CSE. The App-Id represents an identifier value for the application. The App-Inst-Id refers to an application instance that operates in the actual operating environment, and if this value is 1, it means that the corresponding application resource is in the state of the application instance. Alternatively, the App-Inst-ID may include separate information for identifying the application instance.

Figure 10:
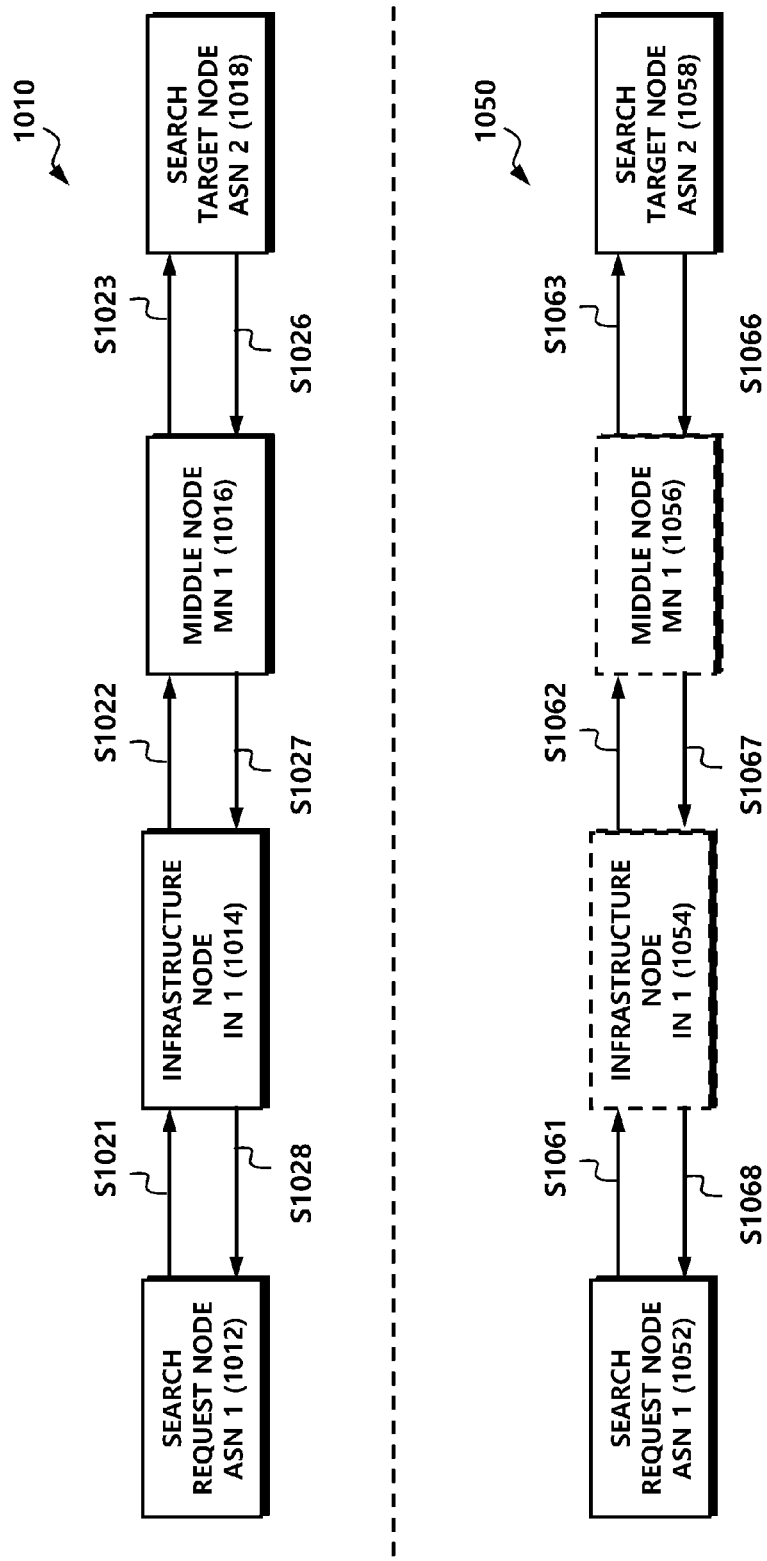
FIG. 10 is a view showing the operation of making a request for searching for an available device, according to an embodiment of the present invention.

FIG. 10 is a view showing the operation of making a request for searching for an available device, according to an embodiment of the present invention.

1010 shows a process of making a request for a search of available devices, which is based on the search range, and 1050 shows a process of making a request for a search of available devices, which is not based on the search range.

The search process 1010 will be described below. The ASN 1 (1012) delivers a search request message to the infrastructure node 1 (1014) in order to search for available devices at a specific location based on the search range (S1021). The search request message contains location information of the ASN 1 (1012), search range information, or application state information of available devices. The location information and the search range information may be optionally contained in the search request message of the ASN 1 (1012), and the application state information refers to an attribute value indicating the state of the application among the application resource information.

When the search request message containing the conditions, such as the search range, is delivered to the infrastructure node 1 (1014), the infrastructure node 1 (1014) identifies the search request message, and discover the closest MN 1 (1016) to the ASN 1 (1012), which has made the search request, in order to thereby delivers the search request message to the MN 1 (1016) (S1022). The MN 1 (1016) identifies the search request message, and performs a broadcast (S1023). The ASN 2 (1018) that receives the broadcast message delivers an application resource containing the current state and location information of its own application to the MN 1 (1016), which has made a request (S1026). The MN 1 (1016) delivers the response result to the infrastructure node 1 (1014) (S1027), and the infrastructure node 1 (1014) selects the response result that conforms to the search request conditions among the response result and delivers the same to the ASN 1 (1012) (S1028).

Summarizing the search process 1010, when a node, which requests a search, transmits a search request message, the infrastructure node or the middle node receives the same, and broadcasts the search request message to the nodes to be searched for, which exist within the search range, by using the location information of the node that has made the search request.

The search process 1050 will be described below, in which the search request message does not contain the search range as the search conditions. The infrastructure node 1 (1054) receives a search request message from the ASN 1 (1052) in S1061, and delivers the search request message to a search target in order to know the application state of the search target (S1062 and S1063). The search node ASN 2 (1058), which has received the search request, identifies the search request message, and includes the current application state information in the application resource information in order to thereby deliver the response result to the infrastructure node 1 (1054) (S1066 and S1067). The infrastructure node 1 (1054) identifies the response result, and delivers, to the ASN 1 (1052), the response result that conforms to the search request conditions. In the case where the infrastructure node 1 (1054) delivers the search request to the ASN 2 (1058), if the ASN 2 (1058) is far away, the infrastructure node (1054) may deliver the search request through the middle node MN 1 (1056) (S1062). In addition, the target node ASN 2 (1058) may directly receive and identify the search request containing the search request message from the ASN 1, and may deliver, as a response result, the corresponding application resource information to the ASN 1 (1052).

In the process 1050 of FIG. 10, the infrastructure node IN 1 (1054) and the middle nodes MN 1 (1056) are illustrated by dotted lines because they are selectively configured.

Figure 11:
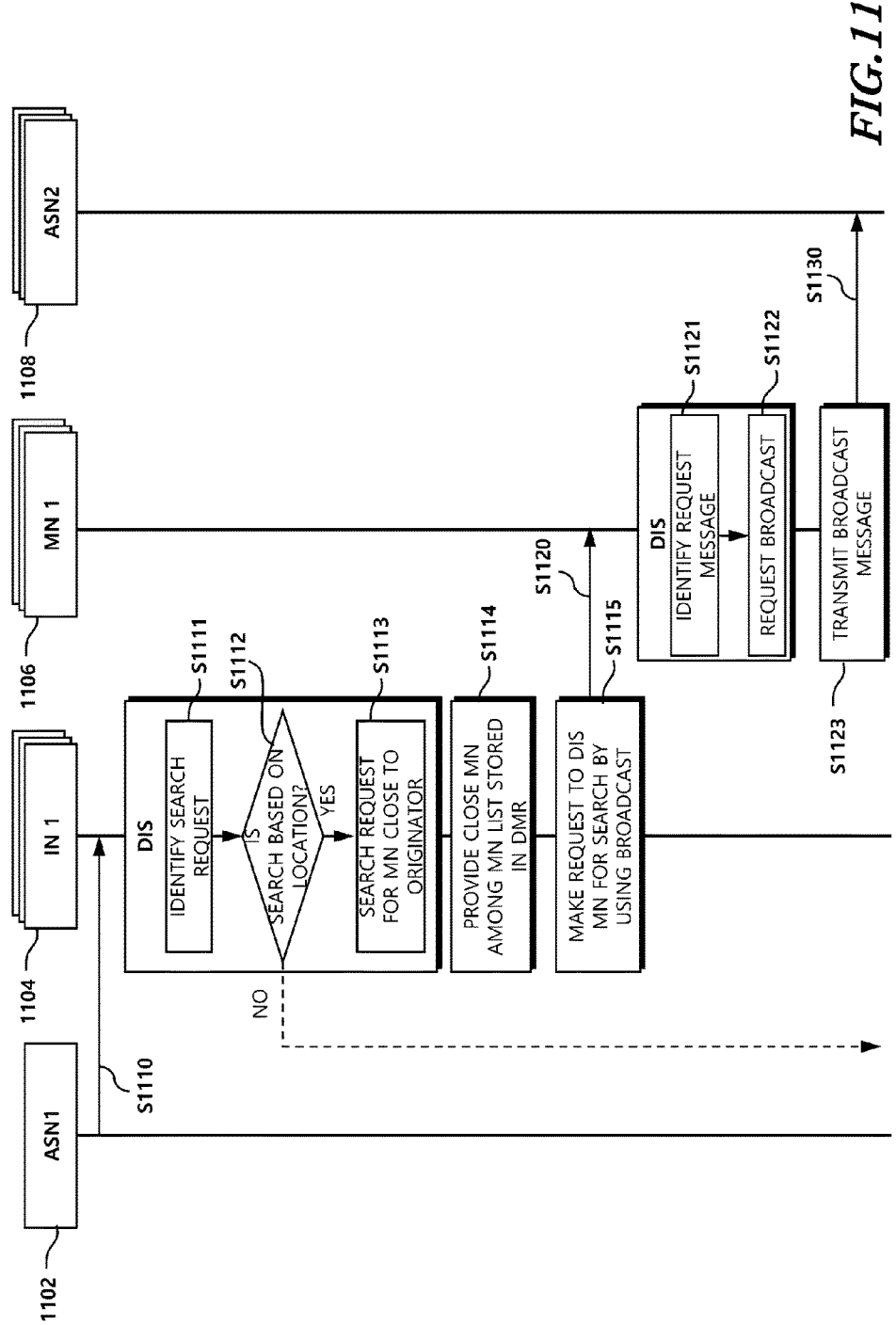
FIGS. 11, 12, and 13 are views showing the details of an operation for making a request for searching for an available device, according to an embodiment of the present invention.
Figure 12:
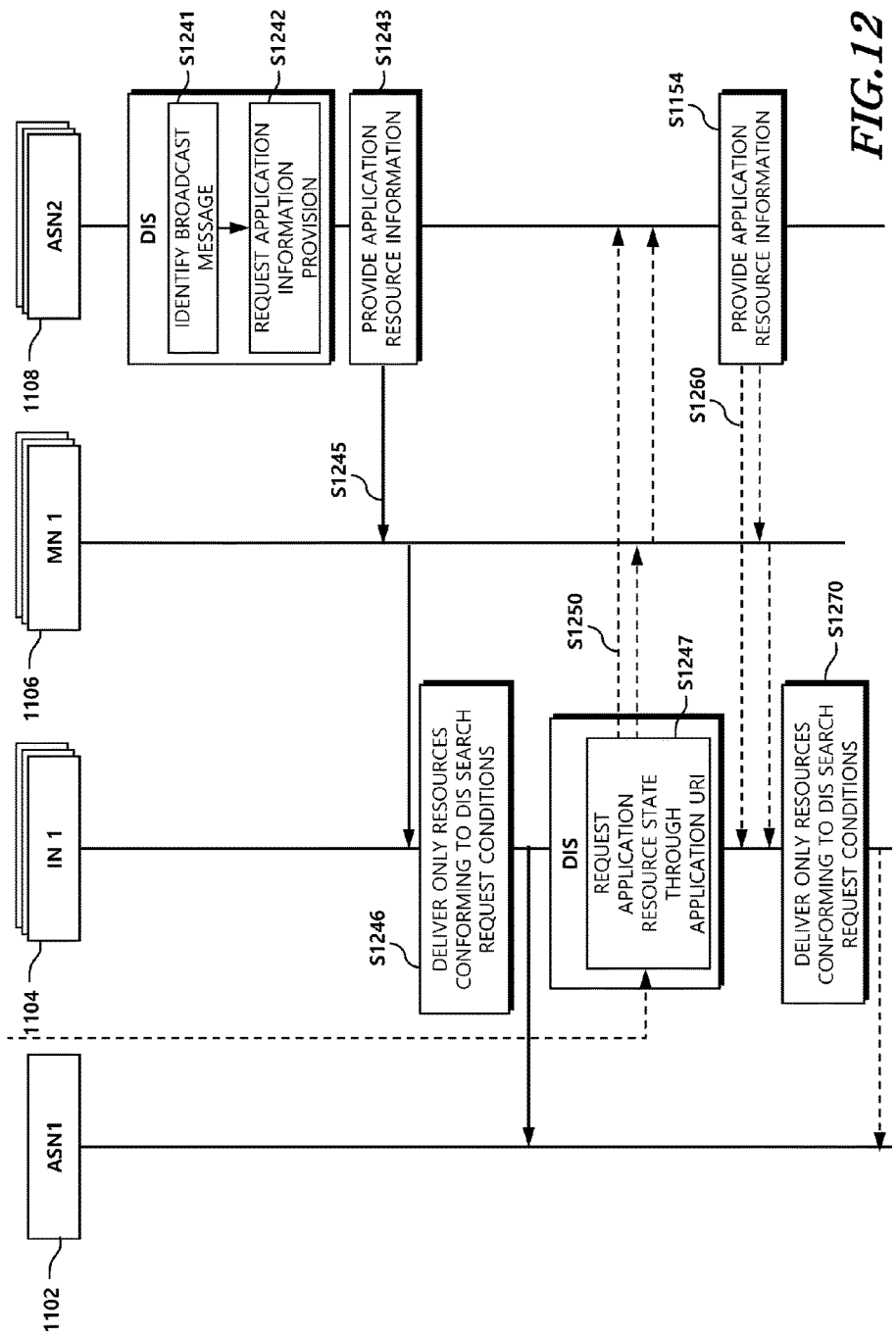
Figure 13:
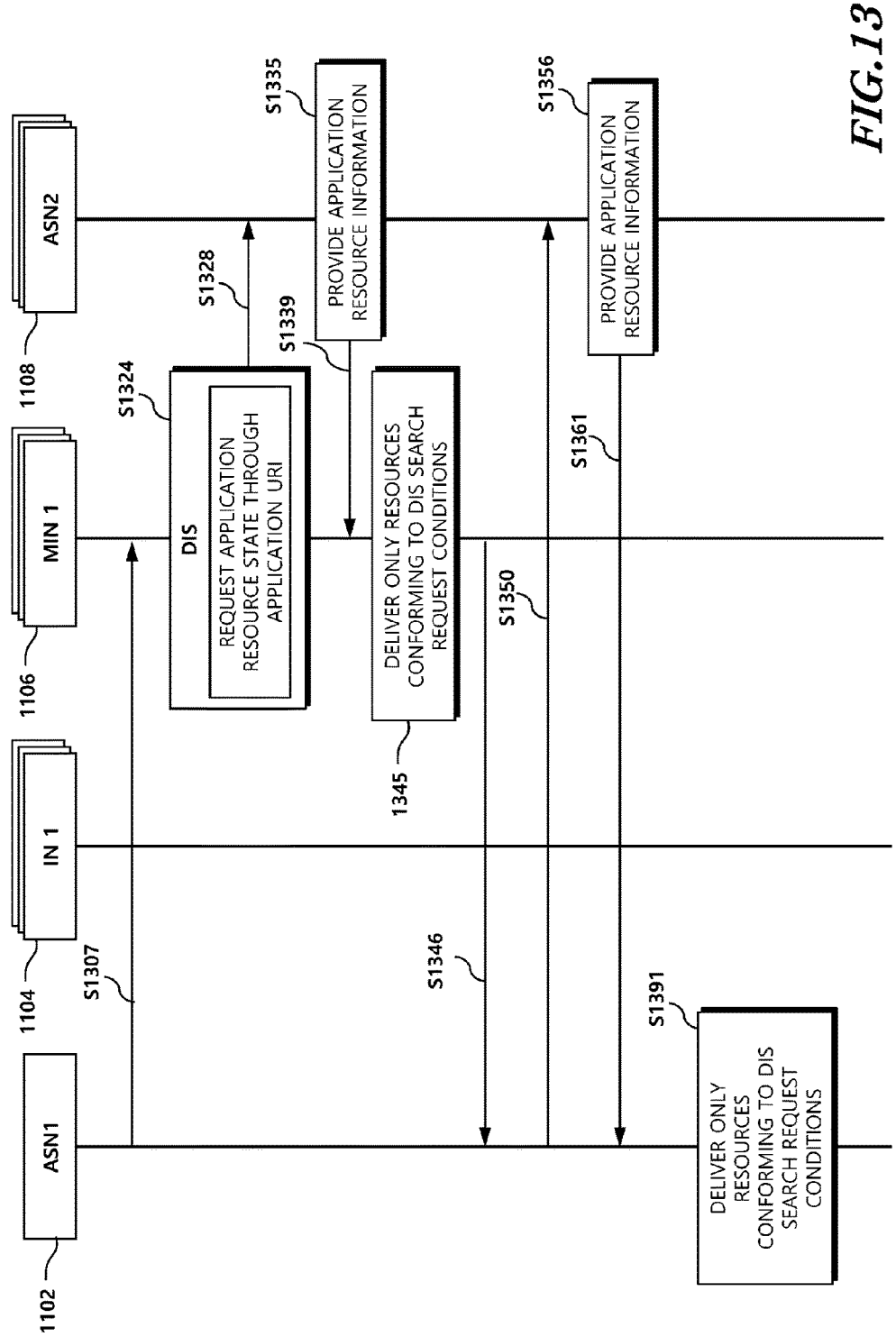

FIGS. 11, 12, and 13 are views showing the details of an operation for making a request for searching for an available device, according to an embodiment of the present invention.

The ASN 1 (1102) creates a search request message that contains information on the target to be searched for (for example, an application ID, a group URI, or application search words) and optionally contains the search range. The ASN 1 (1102) transmits the search request message to the infrastructure node IN 1 (1104) (S1110). A discovery unit of the IN 1 (1104) identifies the search request message (S1111), and determines whether or not the search request message optionally contains the search range condition (S1112). If the search range request condition is contained, the IN 1 makes a request to the data management and repository (DMR) for searching for the closest MN to the ASN 1 (1102) that is the originator, which has made a request for the search (S1113). The data management and repository provides access information of the closest MN (1106) (S1114), the discovery unit delivers a search request message containing a broadcast request message to the MN 1 (1106) (S1115 and S1120).

A discovery unit of the MN 1 (1106) identifies the search request message received from the IN 1 (1104) (S1121), and makes a request for performing a broadcast containing the search conditions (S1122). The MN 1 (1106) performs the broadcast containing the search request message (S1123 and S1130).

Subsequent operations are performed in FIG. 12.

The ASN 2 (1108) receives and identifies the broadcast search request message (S1241), and makes a request to an application service management unit for an application resource containing state information of the application (S1242). The application service management unit configures information on the application resource that conforms to the search request message conditions, and returns the response result to the MN 1 (1106) (S1243 and S1245). At this time, if there is no application instance, or if no application instance is available, the application service management unit creates the application instance, and configures the application resource information in order to thereby return the response result to the MN 1 (1106).

The MN 1 (1106) delivers the response result to the IN 1 (1104) (S1245), and the IN 1 (1104) only selects items that conform to the search request conditions from the response result, and returns the response result to the ASN 1 (1102) (S1246).

If the search request message of the ASN 1 (1102) does not contain the search range condition (in the case of 'NO' in operation S1112 of FIG. 11), the discovery unit of the IN 1 (1104), which receives the search request message, performs operations S1111 and S1112 in the same manner, and delivers the search request message to the ASN 2 (1108) corresponding to the search target information contained in the search request message (S1247). The ASN 2 (1108) identifies the search request message, and stores the current application information that conforms to the search request message conditions in the form of an application resource by means of the CSE in order to thereby return the response result (S1254). At this time, if there is no application instance, or if all of the application instances are not available, it creates the application instance and configures the application resource information in order to thereby return the response result to the IN 1 (1104) (S1260). The discovery unit of the IN 1 (1104) that has received the response result only selects items that conform to the search request conditions, and returns the response result to the ASN 1 (1102) (S1270).

Subsequent operations are performed in FIG. 13.

If the ASN 1 (1102) delivers, to the MN 1 (1106), a search request that does not contain a search range, the MN 1 (1106) identifies the search request message and delivers the search request to the ASN 2 (1108) corresponding to the search target (S1324). The ASN 2 (1108), which has received the search request message, identifies the search request message, and stores the current application instance information that conforms to the search request message conditions in the form of an application resource by means of the CSE in order to thereby return the response result (S1335 and S1339). At this time, if there is no application instance, or if no application instance is available, it creates the application instance and configures the application resource information in order to thereby return the response result to the MN 1 (1106). The discovery unit of the MN 1 (1106) that has received the response result selects only items that conform to the search request conditions, and returns the response result to the ASN 1 (1102) (S1345 and S1346).

If the ASN 1 (1102) delivers, to the search target ASN 2 (1108), a search request that does not contain a search range, the ASN 2 (1108) receives and identifies the search request message, and stores the current application information that conforms to the search request message conditions in the form of an application resource by means of the CSE in order to thereby return the response result (S1356). At this time, if there is no application instance, or if no application instance is available, it creates the application instance and configures the application resource information in order to thereby return the response result to the MN 1 (1106). The discovery unit of the MN 1 (1106) that has received the response result selects only items that conform to the search request conditions, and returns the response result to the ASN 1 (1102) (S1391).

A summary of the description in FIGS. 11 to 13 is as follows.

The elements constituting the M2M system includes search nodes (IN1 and MN1), target nodes (IN1, MN1, and ASN2), and a request node (ASN1), which transmit/receive the request message and perform a search. The IN1 and the MN1 are search nodes and target nodes. That is, the IN1 becomes a target node in the case of receiving a search request message from the ASN1, and becomes a search node in the case of delivering the search request message to the MN1. Similarly, the MN1 becomes a target node in the case of receiving a search request message from the IN1, and becomes a search node in the case of delivering the search request message to the ASN2.

In the case where the request node, the search node, and the target node are the IN1, the MN1, and the ASN2, respectively, FIGS. 11 to 13 may be summarized as follows.

The request node 1104 creates a search request message of the application resource, which contains a search request message, and transmits the same to the search node 1106. In addition, if the received message indicates a search of available applications, the search node 1106 performs a search by using state information of the application resource, and delivers the received message to the target node 1108 in order to thereby receive a response result containing the application resource from the target node 1108. Meanwhile, the target node 1108 performs the search by using the state information of the application resource.

The search node may be an infrastructure node or a middle node, and the target node may be a middle node or an application service node. In addition, the application resource may contain at least one of: an application ID (AppId); an application instance ID (App-Inst-Id); the service expiration time (expirationTime); the access right (accessRightID); the creation time (creationTime); the last modified time of a resource (lastModifiedTime); a creator; the current lifetime of the application (lifetime); state information (lifecyclestatus); search keywords (searchStrings); the reception or non-reception of a message from the CSE; state information of the application (reachabilityStatus); group information (group); or subscription information (subscription).

The available state of the device may include at least one of: the state in which all of the nodes, the CSEs, and the applications, which constitute the device, are available; the state in which the node or the CSE can receive and process the request message; or the state in which the application instance can receive the request message from the CSE and can process the same.

In addition, the state information of the application resource may include, as the state of application instance, either the lifeCycleStatus or the reachabilityStatus.

As described in S1112 above, the search request message may contain the search range, and the search node may deliver the message to a target node within the search range.

FIGS. 14 to 19 are views showing the configuration of a message, according to an embodiment of the present invention.

Figure 14:
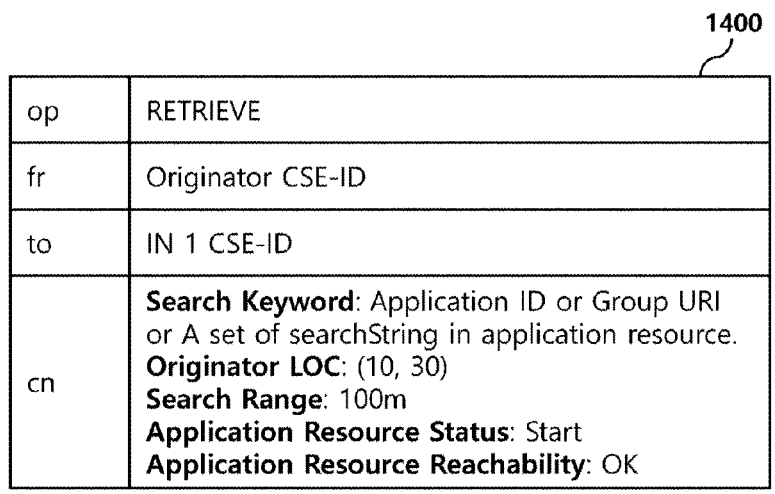
Figure 15:
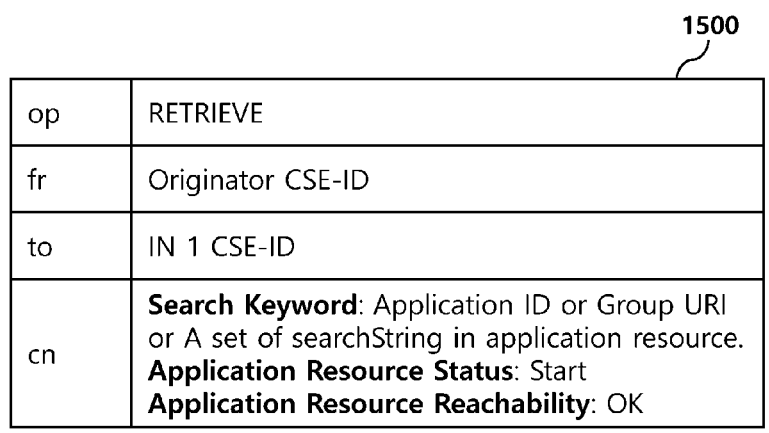

1400 and 1500 of FIGS. 14 and 15 show the configuration of a message that can be used in the case of making a request for a search, respectively (S1110 in FIG. 11). In the case of a search request message containing the search range, op refers to an instruction, and is given "RETRIEVE". "fr" is message sender information, which contains CSE-ID information of the ASN 1 (1102) as a sender in 1400 and 1500. "to" is message recipient information, which contains the CSE-ID of the IN 1. In addition, "cn" is the content of the message, which contains the search range, search keywords, the sender's location (Originator LOC), or application state information (Application Resource lifecycleStatus and Application Resource Reachability) in the case of the search request message containing the search range (1400). In the case of a search request message that does not contain the search range (1500), the search requester location and the search range are not included.

1600 of FIG. 16 shows a search request message by which the IN 1 (1104) makes a request to the MN 1 (1106) for a broadcast search in the case of a search request message containing the search range (S1120 in FIG. 11). The IN 1 (1104) includes a search method in the search request message received from the ASN 1 (1102), and delivers the same to the MN 1 (1106). The broadcast discovery request message contains originator location information (Originator LOC) 10 or 30.

1700 of FIG. 17 refers to a message form that is included when the MN 1 (1106) performs a broadcast (S1130 in FIG. 11). The search keywords include an application ID, a group URI, and searchStrings information.

1800 of FIG. 18 shows a message form that is configured when the ASN 1 (1102) delivers, to the IN 1 (1104), a search request message that does not contain the search range request condition and then the IN 1 (1104) delivers the search request message to the target that is designated in the search keywords (S1250 in FIG. 12). "mi" is meta information of the search request message wherein "rt" designates a response result form and "da" allows the message to be transmitted to the search request target through delivery. "rt" may receive in the form of an application resource, and "da", which is set to be ON, allows the IN 1 to transmit the message to the ASN2 through delivery.

Figure 19:
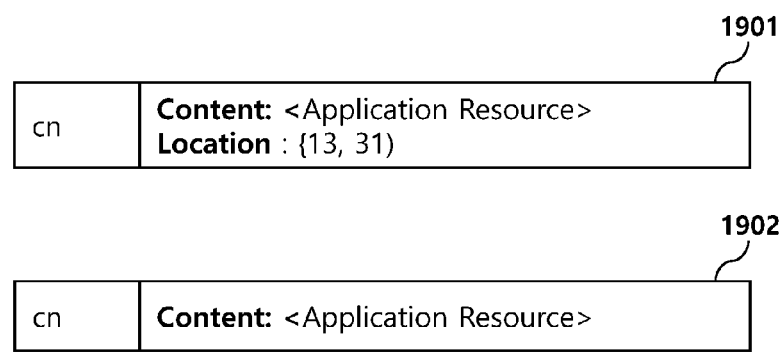

1901 and 1902 of FIG. 19 show a response result message of the ASN2 (1108) in response to the search request message (S1245 and S1260 in FIG. 12, respectively). In the case where the application resource is received as the response result in the item "cn", 1901 shows a response result in response to the search request message that is broadcast as a search request containing the range. In other cases, the response result is configured in the form of 1902.

In the case of describing the message transmission and response of FIG. 13 by using FIGS. 14 to 19, S1307, S1328, S1339, S1350, and S1361 of FIG. 13 is the same as 1500, 1800, 1902, 1500, and 1902, respectively.

FIG. 20 is a view showing an example of the responded application resource, according to an embodiment of the present invention.

The application instance may be in the available state when the lifeCycleStatus has a value except for a value in which the original function of the application cannot be executed in the example of Deployed, Install, Stop, or Uninstall, when the reachabilityStatus is in the "OK" state, in which the application instance can receive a message from the CSE, or when the App-Inst-Id exists and represents the application instance. If the reachabilityStatus is not in the "OK" state so that the message cannot be received, or if the lifeCycleStatus has a value in which the application cannot be actually executed, the corresponding application instance is in the unavailable state.

In the description above, the available device and the resource type that contains the state information of the application have been defined, and the embodiments of the search by using the same are disclosed. Hereinafter, the device and operation will be described in more detail.

First, the available device means the state in which the nodes, the CSEs, and the applications, which constitute the device, can be used. In the case where the device for receiving the search request message processes the search request message, it means that the device is in the process of receiving the search request message and executing instructions, so the node and the CSE are in the available state. However, when the node and the CSE are available but the application is unavailable, the device is in the unavailable state. Therefore, the present invention suggests a method for searching for available devices by recognizing the availability of the application on the assumption that the node and the CSE are in the available state because the node and the CSE receive and process the search request message.

Information on the application that is executed in the device is stored in the application resource, and the application resource is created as a result of the successful registration with the local CSE. In addition, the application resource may be CRUD (Created, Retrieved, Updated, and Deleted). The element of the application resource may contain the element "lifeCycleStatus" that has the current lifetime information and the element "ReachabilityStatus" that represents the state in which a message can be received from the CSE. The elements "LifeCycleStatus" and "ReachabilityStatus" are used as information to figure out the state of the application. The elements have values "App-Id" and "App-Inst-Id" to separate the application resources in the case where a plurality of applications are contained in a single device. The application that exists in the real environment has the value "App-Inst-Id", which is referred to as an application instance.

The embodiments for discovering available devices may include the case of discovering available devices by using the search range and the case of discovering available devices by designating search targets. The case of discovering available devices by designating search targets may be separated into cases where a search request is made to the infrastructure node, the middle node, and the search target node, respectively.

The embodiment of searching for available devices by using the search range will be described below. The first infrastructure node, which constitutes an M2M system comprised of infrastructure nodes, includes a discovery unit that is configured to: identify a search request message of a request application service node as an originator; determine whether or not a search range is contained; make a request to a data management and repository unit for discovering the closest middle node to the request application service node; and make a request to the middle node for the search by a broadcast, and a data management designating unit that is configured to have a middle node list to serve in the first infrastructure node, wherein the result of the search request is delivered to the first application service node.

In addition, the first middle node, which receives the search request message from the first infrastructure node, includes a discovery unit that identifies the search request message and performs a broadcast request, and a communication management/delivery handling unit that performs the broadcast. In addition, the second application service node for identifying the broadcast message includes: a discovery unit that identifies the broadcast message and makes a request for the application state; a CSE that identifies the current application state and provides information in the form of an application resource; the step of transmitting the received result to the first infrastructure node through the first middle node; and the step of delivering, to the first application service node, information that conforms to the search request conditions among the result received from the first middle node.

An embodiment of searching for available devices by designating the search targets includes the steps of: letting the first infrastructure node, which constitutes an M2M system that is comprised of infrastructure nodes, identify a search request message of a request application service node as an originator in order to thereby deliver an available state confirmation request to the second application service node that is a search target; letting the second application service node receive an available state request message and make a request to the CSE for the available state; delivering the received result to the first infrastructure node; and letting the second application service node deliver information that conforms to the search request conditions to the first application service node.

Another embodiment of searching for available devices by designating the search targets includes the steps of: letting the first middle node, which constitutes an M2M system that is comprised of middle nodes, identify a search request message of a request application service node as an originator in order to thereby deliver an available state confirmation request to the second application service node that is a search target; letting the second application service node receive an available state request message and make a request to the CSE for the available state; delivering the executed result to the first middle node; and letting the first middle node receive the same and deliver information that conforms to the search request conditions to the first application service node.

Another embodiment of searching for available devices by designating the search targets includes the steps of: letting the second application service node, which is a search target, identify a search request message of a request application service node as an originator; letting the second application service node make a request to the CSE for the available state; delivering the executed result to the first application service node; and letting the first application service node select information that conforms to the search request conditions.

Figure 21:
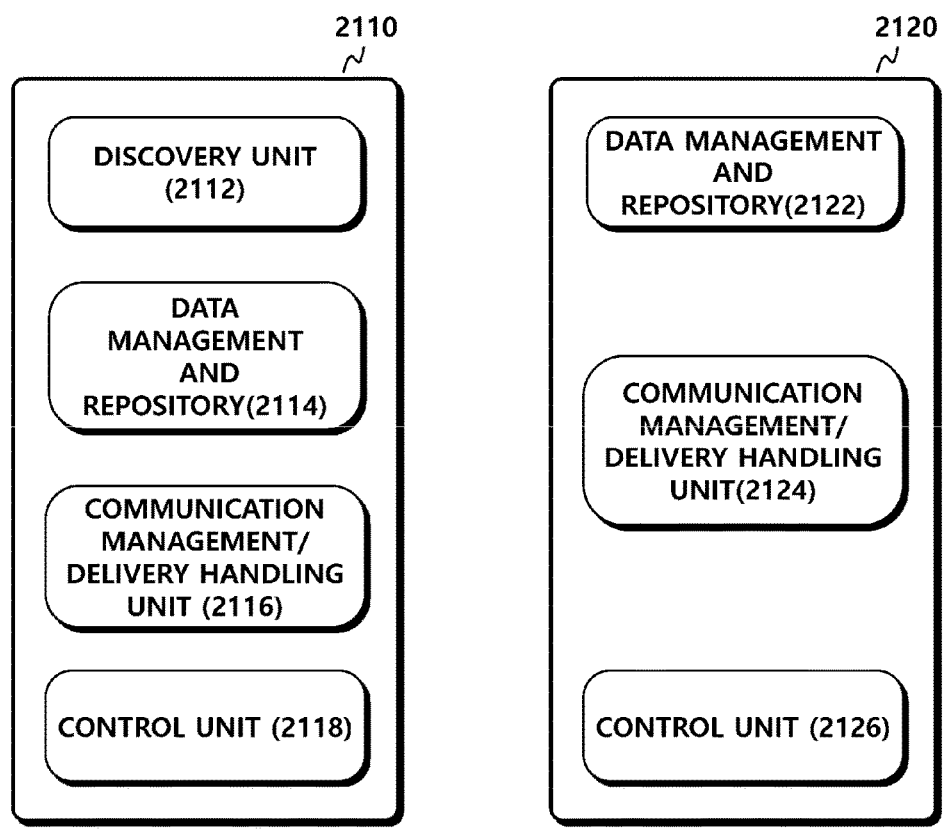
FIG. 21 is a view showing the configuration of a search node for performing a search and a target node to be searched, according to an embodiment of the present invention.

FIG. 21 is a view showing the configuration of the search node for performing a search and the target node to be searched, according to an embodiment of the present invention.

The node 2110 (the search node) for performing a search refers to the middle node or the infrastructure node, and the node 2120 to be searched for refers to: the node that has an application to be searched for, such as the ASN2 above; or the middle node or the infrastructure node that receives the search request message from the node 2110 for performing a search.

The configuration of the M2M node 2110 will be described, which constitutes the M2M system that includes a request node (including the originator and the infrastructure node for receiving the search request message from the originator and delivering the same) that transmits the search request message and a target node (the search target node 2120) that provides a search result.

A discovery unit 2112 receives a search request message from the request node and receives a search result including an application resource from the target node (search target node). A communication management/delivery handling unit 2116 delivers the received message to the target node if the received message indicates a search of available applications. In addition, a control unit 2118 controls the discovery unit 2112 and the communication management/delivery handling unit 2116 to perform the search by using state information of the application resource. The M2M node 2110 searches for available devices in the M2M environment.

More specifically, if the search request message requests a location-based range search, the discovery unit 2112 may retrieve information of the closest middle node to the originator node of the search request message from the data management and repository 2114.

In addition, the M2M node 2110 may be an infrastructure node or a middle node. The target node 2120 may be a middle node or an application service node. In addition, in the case where the infrastructure node can deliver the search request message to another infrastructure node, or in the case where the search request is received from the application service node in order to thereby perform the search, the target node 2120 may be the infrastructure node.

The state information of the application resource refers to the state of the application instance, and contains one of the lifeCycleStatus state or the reachabilityStatus state. The state information of the application resource may be controlled to be included in the search result or excluded therefrom according to the state of the application instance upon the search. In addition, the search request message may contain the search range, and the M2M node 2110 may deliver the message to the target node 2120 within the search range.

Next, the search target node 2120 will be described. The search target node 2120 becomes an infrastructure node, a middle node, or an application service node, and it is the M2M node 2120 that receives a search request message and provides a search result. According to the configuration thereof, it includes: a communication management/delivery handling unit 2124 that receives the search request message; a data management and repository 2122 that identifies the installation or availability of the application if the received message indicates a search of available applications; and a control unit 2126 that controls the communication management/delivery handling unit 2116 to transmit state information of the application resource to the node that has transmitted the search request message in the case where the application has been installed and the application is available. The M2M node 2120 provides an application resource that is available in the M2M environment. The control unit 2126 identifies service expiration time information of the application, and transmits the state information of the application resource of which the application service time has not expired. Here, even when the service time has not expired but the service time is about to expire, the service may be regarded to be terminated.

As specific details that are applied in common to the search node 2110 and the target node 2120 of FIG. 21, the application resource contains at least one of: an application ID (AppId); an application instance ID (App-Inst-Id); the service expiration time (expirationTime); the access right (accessRightID); the creation time (creationTime); the last modified time of a resource (lastModifiedTime); a creator; the current lifetime of the application (lifetime); state information (lifecyclestatus); search keywords (searchStrings); the reception or non-reception of a message from the CSE; state information of the application (reachabilityStatus); group information (group); or subscription information (subscription).

The available state of the device may include at least one of: the state in which all of the nodes, the CSEs, and the applications, which constitute the device, are available; the state in which the node or the CSE can receive and process the request message; or the state in which the application instance can receive the request message from the CSE and can process the same. In addition, the state information of the application resource may include, as the state of application instance, either the lifeCycleStatus or the reachabilityStatus.

Figure 22:
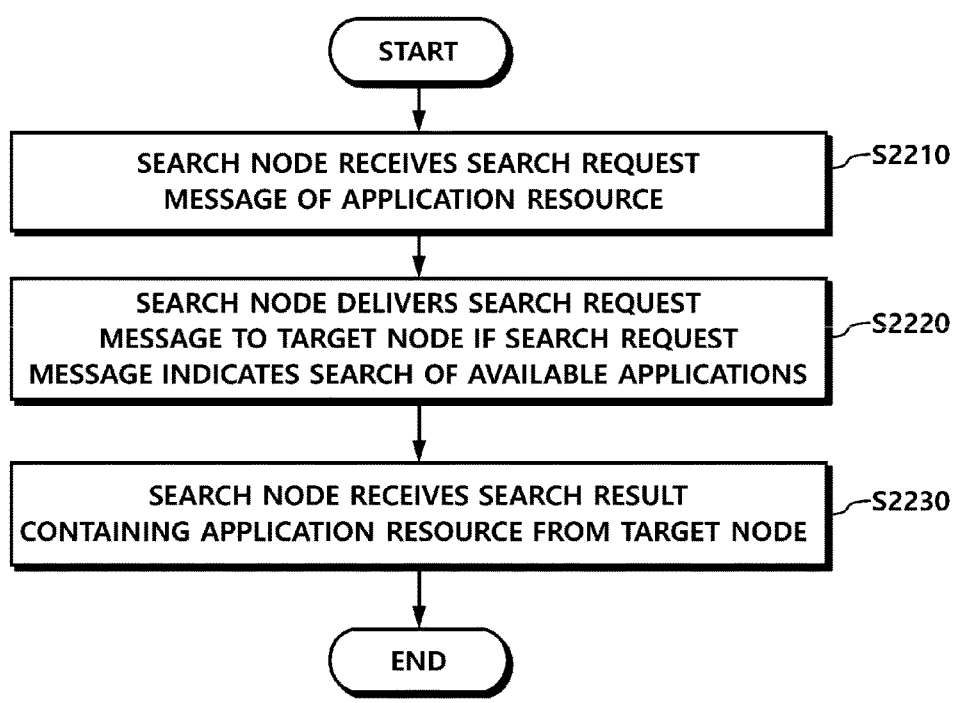
FIG. 22 is a view showing the operation of searching for an available device in the M2M environment based on the search node, according to an embodiment of the present invention.

FIG. 22 is a view showing the operation of searching for available devices in the M2M environment based on the search node, according to an embodiment of the present invention. The search node may be the IN1 or the MN1 of FIGS. 11 to 13 above.

When the search node receives a search request message of the application resource (S2210), the search node identifies whether or not the search request message indicates a search of available applications, and if the search request message indicates a search of available applications, the search node delivers the search request message to the target node (S2220). Thereafter, the search node or the target node performs a search by using the state information of the application resource (S2230). More specifically, the search nodes may be an infrastructure node or the middle node, and the target node may be a middle node or an application service node. The application resource contains at least one of: an application ID (AppId); an application instance ID (App-Inst-Id); the service expiration time (expirationTime); the access right (accessRightID); the creation time (creationTime); the last modified time of a resource (lastModifiedTime); a creator; the current lifetime of the application (lifetime); state information (lifecyclestatus); search keywords (searchStrings); the reception or non-reception of a message from the CSE; state information of the application (reachabilityStatus); group information (group); or subscription information (subscription).

In addition, the available state of the device may include at least one of: the state in which all of the nodes, the CSEs, and the applications, which constitute the device, are available; the state in which the node or the CSE can receive and process the request message; or the state in which the application instance can receive the request message from the CSE and can process the same.

In addition, the state information of the application resource may include, as the state of application instance, either the lifeCycleStatus or the reachabilityStatus.

Meanwhile, the search request message may contain search range, and in this case, the search node delivers the message to the target node within the search range.

The embodiment of the present invention described above relates to a method for searching for available devices in the M2M system, and is comprised of: the ASN1 that transmits a search request containing the search target, the application state information, or the request range; the IN 1 and the MN 1 that receive and process the search request; and the ASN2 that receives an application state request and provides a result in order to thereby propose a method for searching for available devices when an event for using the device occurs.

The IN 1, which receives the search request message from the originator ASN 1, selects the closest MN 1 to the search target node and the ASN 1 in order to thereby deliver the search request. Alternatively, the MN 1, which receives the search request message from the originator ASN 1, delivers the search request to the search target node, or the search request message of the originator ASN 1 is delivered to the ASN 2, which is a search target. When the search target node receives the search request message, the search target node returns a result that includes information containing the current state of the application. In the case of a search request based on the range, the IN 1, which makes a search request, delivers the search request to the closest MN 1 to the ASN 1. The MN 1 performs a broadcast, and the ASN 2, which receives the same, returns a result that includes information containing the state of the application.

The description above merely shows examples of the technical concept of the present invention, and various modifications and changes can be made by those skilled in the art without departing from the essential characteristics of the present invention. Therefore, the embodiments described herein are not intended to limit the technical concept of the present invention, so the scope of the present invention is not limited to the embodiments. The scope of the present invention should be construed by the following claims, and all of the spirits equivalent thereto should be construed as being included in the scope of the present invention.

The invention claimed is:

1. A Machine to Machine (M2M) node constituting an M2M system that includes a request node for transmitting a search request message and a target node for providing a search result, and searching for available devices in the M2M environment, the M2M node comprising at least one hardware processor which executes:
   a discovery unit configured to receive the search request message from the request node and configured to receive the search result containing an application resource from the target node;
   a communication management/delivery handling unit configured to deliver the received search request message to the target node if the received search request message indicates a search of available applications; and
   a control unit configured to control the discovery unit and the communication management/delivery handling unit to perform a search for the available devices by using state information of the application resource included in the received search result,
   wherein the state information of the application resource includes i) information on a current state associated with at least one of installation and availability of an application and ii) a reachability status value to be used to determine whether a corresponding application instance is currently available for receiving a message from a common service entity (CSE).

2. The M2M node according to claim 1, wherein the discovery unit searches for, from a data management and repository, information on a closest middle node to an originator node of the search request message in the case where the search request message requests a location-based range search.

3. The M2M node according to claim 1, wherein the M2M node is an infrastructure node or a middle node, and the target node is a middle node or an application service node.

4. The M2M node according to claim 1, wherein the application resource further contains at least one of: an application ID (AppId); an application instance ID (AppInst-Id); a service expiration time (expirationTime); an access right (accessRightID); a creation time (creationTime); a last modified time of a resource (lastModifiedTime); a creator; state information on a current lifetime of the application (lifecyclestatus); search keywords (searchStrings); group information (group); and subscription information (subscription).

5. The M2M node according to claim 1, wherein an available state of the device includes at least one of: the state in which all of the nodes, common service entities (CSEs), and the applications, which constitute the device, are available; the state in which the node or the CSE can receive and process the request message; or the state in which the application instance can receive the request message from the CSE and can process the same.

6. The M2M node according to claim 1, wherein the state information of the application resource contains, as the state of application instance, lifeCycleStatus.

7. The M2M node according to claim 1, wherein the search request message contains a search range, and the M2M node delivers the message to the target node within the search range.

8. A Machine to Machine (M2M) node for receiving a search request message and providing a search result, which provides an application resource that is available in the M2M environment, the M2M node comprising at least one hardware processor which executes:
   a communication management/delivery handling unit configured to receive the search request message;
   a data management and repository configured to identify the installation or availability of the application if the received search request message indicates a search of available applications; and
   a control unit configured to control the communication management/delivery handling unit to transmit state information of the application resource to the node that has transmitted the search request message in the case where the application has been installed and the application is available,
   wherein the state information of the application resource includes i) information on a current state associated with at least one of installation and availability of an application and ii) a reachability status value to be used to determine whether a corresponding application instance is currently available for receiving a message from a common service entity (CSE).

9. The M2M node according to claim 8, wherein the application resource further contains at least one of: an application ID (AppId); an application instance ID (AppInst-Id); a service expiration time (expirationTime); an access right (accessRightID); a creation time (creationTime); a last modified time of a resource (lastModifiedTime); a creator; state information on a current lifetime of the application (lifecyclestatus); search keywords (searchStrings); group information (group); and subscription information (subscription).

10. The M2M node according to claim 8, wherein an available state of the device includes at least one of: the state in which all of the nodes, common service entities (CSEs), and the applications, which constitute the device, are available; the state in which the node or the CSE can receive and process the request message; or the state in which the application instance can receive the request message from the CSE and can process the same.

11. The M2M node according to claim 8, wherein the state information of the application resource contains, as the state of application instance, lifeCycleStatus.

12. The M2M node according to claim 8, wherein the control unit identifies service expiration time information of the application, and transmits the state information of the application resource of which the application service time has not expired.

13. A Machine to Machine (M2M) system including a search node, a target node, and a request node for transmitting/receiving a request message and performing a search, which searches for available devices in the M2M environment, the M2M system comprising:
  a request node configured to create a search request message of an application resource and configured to transmit the search request message to the search node;
  a search node configured to receive the search request message from the request node, configured to deliver the received search request message to the target node if the received search request message indicates a search of available applications, configured to receive a search result containing the application resource from the target node, and configured to perform a search for the available devices by using state information of the application resource included in the received search result; and
  a target node configured to receive the search request message delivered from the search node and to transmit the search result containing the application resource to the search node, wherein the state information includes i) information on a current state associated with at least one of installation and availability of an application and ii) a reachability status value to be used to determine whether a corresponding application instance is currently available for receiving a message from a common service entity (CSE).

14. The M2M system according to claim 13, wherein the search node is an infrastructure node or a middle node, and the target node is a middle node or an application service node.

15. The M2M system according to claim 13, wherein the application resource further contains at least one of: an application ID (AppId); an application instance ID (AppInst-Id); a service expiration time (expirationTime); an access right (accessRightID); a creation time (creationTime); a last modified time of a resource (lastModifiedTime); a creator; state information on a current lifetime of the application (lifecyclestatus); search keywords (searchStrings); group information (group); and subscription information (subscription).

16. The M2M system according to claim 13, wherein an available state of the device includes at least one of: the state in which all of the nodes, common service entities (CSEs), and the applications, which constitute the device, are available; the state in which the node or the CSE can receive and process the request message; or the state in which the application instance can receive the request message from the CSE and can process the same.

17. The M2M system according to claim 13, wherein the state information of the application resource contains, as the state of application instance, lifeCycleStatus.

18. The M2M system according to claim 13, wherein the search request message contains a search range and the search node delivers the message to the target node within the search range.

* * * * *